United States Patent [19]

Lee et al.

[11] 4,282,294

[45] Aug. 4, 1981

[54] POLYVINYL BLOCKING LAYER FOR PREVENTING CHARGE INJECTION IN A THERMOPLASTIC PHOTOCONDUCTIVE DEVICE FOR HOLOGRAPHY

[75] Inventors: Tzuo-Chang Lee, Bloomington; John D. Skogen, Burnsville, both of Minn.

[73] Assignee: Honeywell Inc., Minneapolis, Minn.

[21] Appl. No.: 194,493

[22] Filed: Oct. 6, 1980

[51] Int. Cl.[3] .......................... G03G 5/14; G03H 1/02

[52] U.S. Cl. .......................................... 430/1; 430/50; 430/64; 430/909

[58] Field of Search ........................ 430/64, 1, 909, 50

[56] References Cited

U.S. PATENT DOCUMENTS

| | | | |
|---|---|---|---|
| 3,819,369 | 6/1974 | Trubisky | 430/50 X |
| 3,953,207 | 4/1976 | Horgan | 430/58 |
| 4,032,338 | 6/1977 | Gange | 430/64 |
| 4,131,462 | 12/1978 | Lee et al. | 430/2 |

*Primary Examiner*—John D. Welsh

*Attorney, Agent, or Firm*—Omund R. Dahle

[57] ABSTRACT

Charge leakage can occur at a photoconductor-conductor electrode interface of a thermoplastic photoconductive holographic recording medium. This reduces the charge contrast and causes poor performance of the thermoplastic-photoconductive device. In the present invention there is provided a blocking layer of polyvinyl alcohol or polyvinyl butyral between the conductive layer and the photoconductive layer.

6 Claims, 3 Drawing Figures

POLYVINYL BLOCKING LAYER FOR PREVENTING CHARGE INJECTION IN A THERMOPLASTIC PHOTOCONDUCTIVE DEVICE FOR HOLOGRAPHY

BACKGROUND AND SUMMARY OF THE INVENTION

The field of the invention is thermoplastic-photoconductive recording medium. Photoconductive and thermoplastic material are generally applied over transparent conductive electrodes consisting of, for example, indium-tin oxide, indium oxide, nickel chromium, gold, platinum or aluminum, for use as an erasable holographic recording medium. Charge leakage can occur at a photoconductor-conductive electrode interface which reduces the charge contrast, and thus, causes poor performance of the thermoplastic-photoconductive device. The present invention teaches the use of a suitable blocking layer such as polyvinyl alcohol or polyvinyl butyral between the conductive layer and the photoconductive layer.

In the prior art it is known to use a blocking layer between the conductive and photoconductive layer. The U.S. Pat. No. 3,819,369 teaches for the blocking layer the use of phenoxy or epoxy resin with a thickness of between 200 and 400 Angstroms. The U.S. Pat. No. 3,953,207 indicates the layer may comprise any suitable transparent organic polymer or non-polymeric material capable of supporting the injection of photo excited holes from the photoconductive layer. That patent then lists a number of suitable polymers.

In the present invention it is desirable to use a material for the blocking layer which is not soluble in the photoconductor solvent. Such is true of polyvinyl alcohol and polyvinyl butyral. This is not true of the prior art epoxy or phenoxy resins which are soluble in the same solvent used for the photoconductor so that as the layer of photoconductor is applied it tends to dissolve away the blocking layer.

DESCRIPTION

Thermoplastic-photoconductor holographic recording medium for use as an erasable holographic recording medium has generally been in the form of several transparent layers over a transparent substrate. Thus on a substrate such as quartz, nesa glass or a flexible substrate such as Mylar is first coated thereon an optically transparent electrically conductive layer, then a photoconductor layer, and finally a thermoplastic layer.

In prior U.S. Pat. No. 4,131,462, assigned to the same assignee as the present invention, an optically transparent electrically conductive layer is described as a thin film of metal such as gold or indium-tin oxide, the photoconductive layer is described as polyvinyl carbazole (PVK) doped with trinitrofluorenone (TNF) and the top layer is described as a thermoplastic such as resin or synthetic polymers. The transparent conductor layer beneath the thermoplastic-photoconductor medium can also be a number of other materials such as platinum, aluminum, or nickel-chromium (NiCr).

In a thermoplastic-photoconductive recording medium charge leakage can occur at the photoconductor-conductive electrode interface which reduces the charge contrast and thus causes poor performance of the thermoplastic-photoconductor device and therefore resulting in poor or no hologram formation. Ideally, the interface between the photoconductor layer and the conductive layer should be a perfect blocking contact (no dark charge injection into the photoconductive layer) so that a desirable field ratio (close to 1) between the photoconductor and thermoplastic layers can be maintained.

Figure 1:
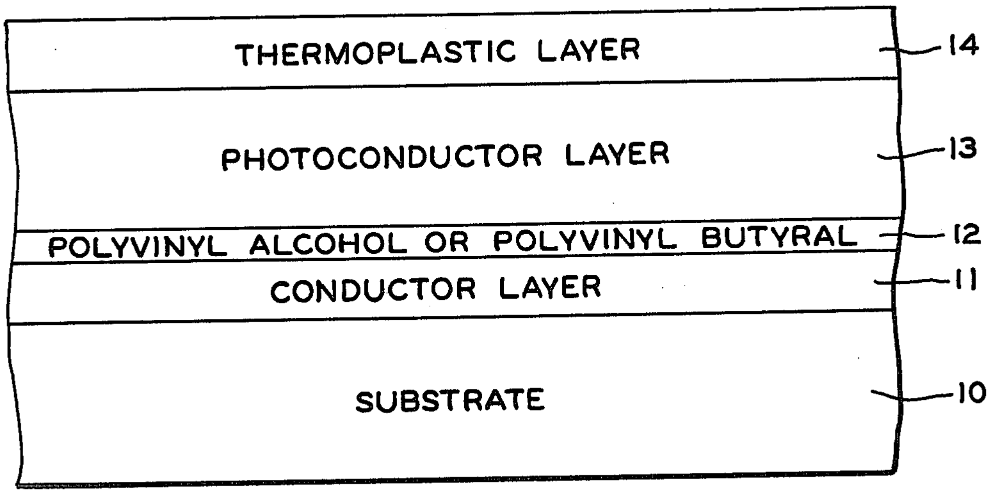
FIG. 1 is a section view of an improved thermoplastic-photoconductive holographic recording medium construction according to the invention.

Referring now to FIG. 1, the thermoplastic-photoconductive recording medium has a transparent substrate or base 10 such as quartz, nesa glass or a flexible Mylar tape having deposited on it a transparent conductive layer 11 such as indium-tin oxide, indium oxide, nickel-chromium, gold, platinum or aluminum. Coating the conductive substrate is a transparent non-photoconductive buffer layer 12 of polyvinyl alcohol or polyvinyl butyral, then a photoconductive layer 13 and then a thermoplastic layer 14. The buffer layer 12 is preferably applied by dissolving the polyvinyl alcohol or polyvinyl butyral in a solvent and spin coating it onto the conductive layer 11. It is important that the next layer when applied does not dissolve the buffer layer. The photoconductor layer 13 is polyvinyl carbazole doped with trinitroflourenone (PVK/TNF). The solvent used for PVK/TNF during deposition is monochlorobenzene, a relatively non-polar solvent. Monochlorobenzene is not a solvent for polyvinyl alcohol or polyvinyl butyral.

Recording on the thermoplastic-photoconductive holographic recording medium of this general nature is described in such articles as "An Experimental Read-Write Holographic Memory", by Stewart, Mezrich, Cosentins, Nagle, Wendt, and Lahmar, RCA Review, 34, 3 (March, 1973), and T. C. Lee, "Holographic Recording on Thermoplastic Films", Appl. Optics 13, 888 (1974). The recording process includes the steps of electrically charging the medium, exposing the medium with the information to be stored, recharging and heating to allow the thermoplastic to deform.

Figure 2:
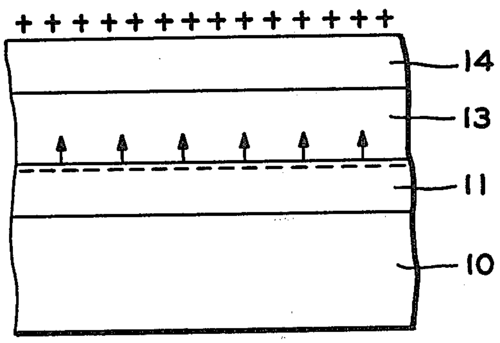
FIG. 2 is a diagrammatic illustration of the effects of unwanted charge injection at the conductor-photoconductor interface.

When electrostatic charges are applied across a device as shown in FIG. 2, which does not have the layer 12, electrons can inject (arrows) into the photoconductive layer 13 causing poor charge acceptance and, therefore poor hologram formation. It is believed that the conductor layer 11 surface morphology may be responsible for the charge injection. It appears that a relatively rough conductive layer surface, as determined by scanning electron microscope (SEM) analysis, tends to be more subject to charge injection than a smooth surface. The present invention of adding the polyvinyl alcohol or polyvinyl butyral layer intermediate the conductive layer and the photoconductive layer provides a structure for eliminating charge injection into photoconductive layer 13.

Figure 3:
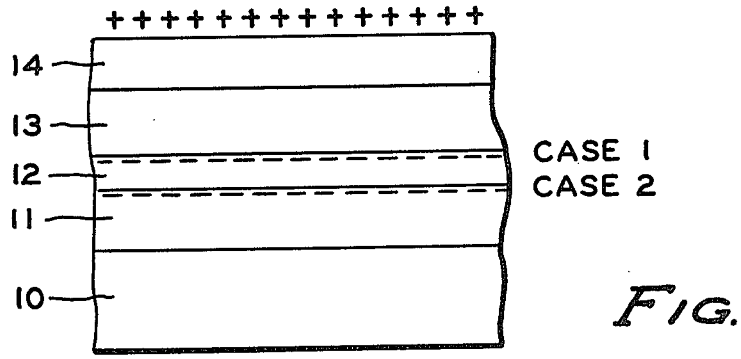
FIG. 3 illustrates charge holding differences in two embodiments of the buffer layer materials.

FIG. 3 shows that the buffer layer 12 material may (Case 2) or may not (Case 1) hold a charge. When polyvinyl alcohol is used as the buffer layer material there is shown an example of Case 1 in that it does not hold a charge. The requirement for the polyvinyl alcohol includes the capability to form a smooth, uniform and transparent coating and it must not be soluble in the solvent used for the photoconductor. When polyvinyl butyral is used as the buffer layer material there is shown an example of Case 2 in that it does hold a charge. Case 2 requirements include all those for Case 1 and in addition must have a Tg (glass transition temperature or initial softening temperature) in the same temperature region as the thermoplastic, that is, in the 60°–80° C. range. This is because the charge must be dissipated between holographic exposures in order to ensure longer effective device life. Polyvinyl butyral has a Tg of 62°–68° C. and is soluble in many alcohols.

The embodiments of the invention in which an exclusive property or right is claimed are defined as follows:

1. An improved thermoplastic holographic recording medium having a charge injection inhibiting layer to inhibit unwanted charge injection, comprising in sequence:

- a substrate coated with an electrically conductive layer;
- a charge injection inhibiting layer selected from a group consisting of polyvinyl alcohol and polyvinyl butyral and mixtures thereof on the electrically conductive layer;
- a photoconductive layer on the inhibiting layer, and;
- a thermoplastic layer over the photoconductive layer, whereby the inhibiting layer prevents unwanted charge injection at the conductor-photoconductor interface.

2. The article according to claim 1 wherein the electrically conductive layer is selected from a group consisting of indium-tin oxide, indium oxide nickel-chromium, gold, platinum or aluminum.

3. The article according to claim 1 wherein the photoconductive layer comprises polyvinyl carbazole doped with trinitrofluorenone.

4. The article according to claim 1 wherein the inhibiting layer is polyvinyl alcohol.

5. The article according to claim 1 wherein the inhibiting layer is polyvinyl butyral.

6. An improved thermoplastic-photoconductive holographic recording medium having a polyvinyl alcohol layer to inhibit charge injection comprising:

- an indium-tin oxide coated quartz substrate for the recording medium;
- a charge injection inhibiting layer of polyvinyl alcohol over said indium-tin oxide;
- a photoconductive layer of polyvinyl carbazole over said polyvinyl alcohol layer; and,
- a thermoplastic layer over the photoconductive layer.

* * * * *